United States Patent
Chang et al.

(10) Patent No.: US 10,498,466 B1
(45) Date of Patent: Dec. 3, 2019

(54) TRANSMITTER CIRCUIT CAPABLE OF MEASURING TRANSMITTER-SIDE IMAGE REJECTION RATIO

(71) Applicant: REALTEK SEMICONDUCTOR CORPORATION, Hsinchu (TW)

(72) Inventors: Yuan-Shuo Chang, Hsinchu (TW); Tzu-Ming Kao, Hualien County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/535,759

(22) Filed: Aug. 8, 2019

(30) Foreign Application Priority Data

Aug. 21, 2018 (TW) .............................. 107129085 A

(51) Int. Cl.
*H04B 17/10* (2015.01)
*H04B 1/04* (2006.01)
*H04B 1/00* (2006.01)

(52) U.S. Cl.
CPC ......... *H04B 17/101* (2015.01); *H04B 1/0003* (2013.01); *H04B 1/04* (2013.01)

(58) Field of Classification Search
CPC ....... H04B 17/101; H04B 1/0003; H04B 1/04
See application file for complete search history.

(56) References Cited

U.S. PATENT DOCUMENTS

| 2010/0099363 A1* | 4/2010 | Faust | H04B 17/10 |
| | | | 455/69 |
| 2012/0213266 A1 | 8/2012 | Su et al. | |
| 2019/0036749 A1* | 1/2019 | Erez | H04L 27/2602 |

FOREIGN PATENT DOCUMENTS

EP       2 712 140 A1    3/2014

OTHER PUBLICATIONS

Taiwanese Office Communication for TW 107129085, search completion date Jan. 22, 2019 (with partial English translation).

* cited by examiner

*Primary Examiner* — Nguyen T Vo
(74) *Attorney, Agent, or Firm* — Birch, Stewart, Kolasch & Birch, LLP

(57) ABSTRACT

A transmitter circuit includes: an in-phase signal processing circuit; a quadrature signal processing circuit; an analog signal processing circuit arranged to operably generate a corresponding analog signal according to the signals outputted from the in-phase signal processing circuit and the quadrature signal processing circuit; a transmitter control circuit arranged to operably control the in-phase signal processing circuit and the quadrature signal processing circuit to cooperate with the analog signal processing circuit to generate a first predetermined signal at a first time point, and to operably control the in-phase signal processing circuit and the quadrature signal processing circuit to cooperate with the analog signal processing circuit to generate a second predetermined signal at a second time point, and an image rejection ratio measurement circuit arranged to operably generate an estimated image rejection ratio of the transmitter circuit.

7 Claims, 4 Drawing Sheets

US 10,498,466 B1

TRANSMITTER CIRCUIT CAPABLE OF MEASURING TRANSMITTER-SIDE IMAGE REJECTION RATIO

CROSS-REFERENCE TO RELATED APPLICATIONS

This application claims the benefit of priority to patent application Ser. No. 10/712,9085, filed in Taiwan on Aug. 21, 2018; the entirety of which is incorporated herein by reference for all purposes.

BACKGROUND

The disclosure generally relates to a transmitter circuit and, more particularly, to a transmitter circuit capable of measuring transmitter-side image rejection ratio.

Gain mismatch and/or phase mismatch between an in-phase signal and a quadrature signal in a transmitter circuit of a wireless communication device, i.e., the so-called I/Q mismatch, can be measured based on the image rejection ratio of the transmitter circuit. Conventionally, the image rejection ratio of the transmitter circuit is typically measured by utilizing an external apparatus, such as a spectrum analyzer, to inspect the signal at the transmitter side of the transmitter circuit.

However, since the conventional measurement approach requires the use of the spectrum analyzer or other external apparatuses, the efficiency and convenience of measurement are not ideal. In particular, when there is a great amount of transmitter circuits to be measured, it would consume considerable labors and time to respectively couple these transmitter circuits one after another with the spectrum analyzer or other external apparatuses.

SUMMARY

An example embodiment of a transmitter circuit is disclosed, comprising: an in-phase signal processing circuit; a quadrature signal processing circuit; an analog signal processing circuit, coupled with an output terminal of the in-phase signal processing circuit and an output terminal of the quadrature signal processing circuit, arranged to operably generate a corresponding analog signal according to signals outputted from the in-phase signal processing circuit and the quadrature signal processing circuit; a transmitter control circuit, coupled with an input terminal of the in-phase signal processing circuit and an input terminal of the quadrature signal processing circuit, arranged to operably control the in-phase signal processing circuit and the quadrature signal processing circuit to cooperate with the analog signal processing circuit to generate a first predetermined signal at a first time point, and to operably control the in-phase signal processing circuit and the quadrature signal processing circuit to cooperate with the analog signal processing circuit to generate a second predetermined signal at a second time point; and an image rejection ratio measurement circuit, coupled with an output terminal of the analog signal processing circuit and the transmitter control circuit, arranged to operably generate an estimated image rejection ratio of the transmitter circuit according to the first predetermined signal and the second predetermined signal under the control of the transmitter control circuit.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
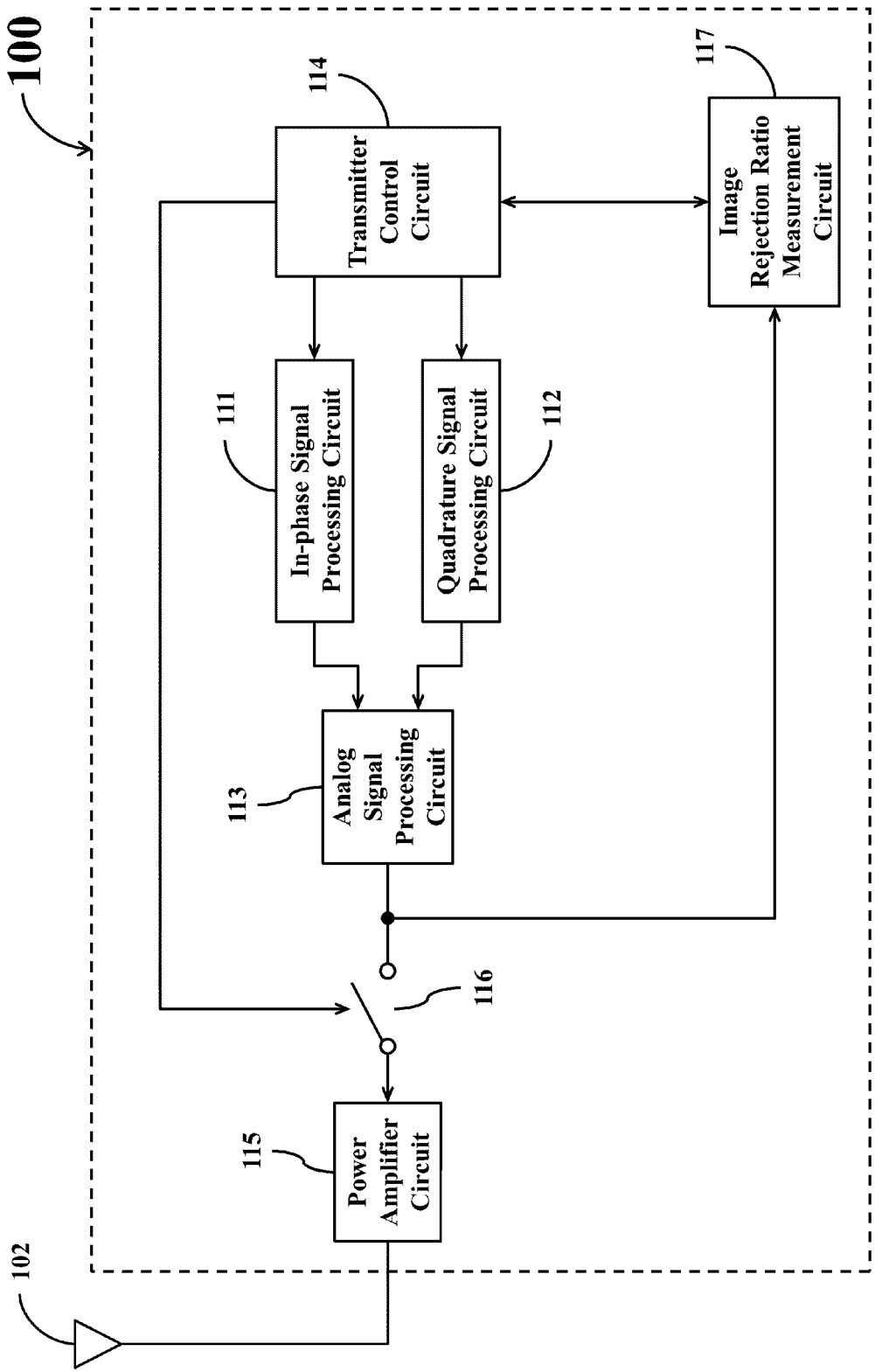
FIG. 1 shows a simplified functional block diagram of a transmitter circuit according to one embodiment of the present disclosure.

FIG. 1 shows a simplified functional block diagram of a transmitter circuit 100 according to one embodiment of the present disclosure. As shown in FIG. 1, the transmitter circuit 100 comprises an in-phase signal processing circuit 111, a quadrature signal processing circuit 112, an analog signal processing circuit 113, a transmitter control circuit 114, a power amplifier circuit 115, a switch 116, and an image rejection ratio measurement circuit 117.

The in-phase signal processing circuit 111 is arranged to operably process in-phase signals generated by the transmitter control circuit 114. The quadrature signal processing circuit 112 is arranged to operably process quadrature signals generated by the transmitter control circuit 114.

The analog signal processing circuit 113 is coupled with an output terminal of the in-phase signal processing circuit 111 and an output terminal of the quadrature signal processing circuit 112. The analog signal processing circuit 113 is arranged to operably generate a corresponding analog signal according to signals outputted from the in-phase signal processing circuit 111 and the quadrature signal processing circuit 112.

The transmitter control circuit 114 is coupled with an input terminal of the in-phase signal processing circuit 111 and an input terminal of the quadrature signal processing circuit 112. The transmitter control circuit 114 is arranged to operably generate in-phase signals required for the operations of the in-phase signal processing circuit 111, and to operably generate quadrature signals required for the operations of the quadrature signal processing circuit 112.

The image rejection ratio measurement circuit 117 is coupled with the transmitter control circuit 114 and an output terminal of the analog signal processing circuit 113. The image rejection ratio measurement circuit 117 is arranged to operably generate an estimated image rejection ratio of the transmitter circuit 100 under control of the transmitter control circuit 114.

The power amplifier circuit 115 is positioned on a signal output path of the analog signal processing circuit 113, and arranged to operably amplify analog signals generated by the analog signal processing circuit 113, so as to operably generate wireless signals to be transmitted through the transmitting antenna 102.

The switch 116 is arranged on a signal output path of the analog signal processing circuit 113, and controlled by the transmitter control circuit 114. In the embodiment of FIG. 1, the switch 116 is positioned between the analog signal processing circuit 113 and the power amplifier circuit 115.

Each of the aforementioned in-phase signal processing circuit 111, the quadrature signal processing circuit 112, the analog signal processing circuit 113, and the power amplifier circuit 115 may be realized with various suitable existing circuits. The transmitter control circuit 114 may be realized with various suitable circuits capable of processing digital signals and having computing capability. The switch 116 may be realized with a single transistor or a combination of multiple suitable transistors. The image rejection ratio measurement circuit 117 may be realized with suitable circuits capable of processing analog signals and having digital computing capability.

In practice, different functional blocks of the aforementioned transmitter circuit 100 may be realized with separate circuits, or may be integrated into a single circuit chip.

During normal operation, the transmitter control circuit 114 turns on the switch 116, so that the analog signals generated by the analog signal processing circuit 113 can be inputted into the power amplifier circuit 115. In this situation, the power amplifier circuit 115 would generate wireless signals to be transmitted through the transmitting antenna 102 according to the analog signals generated by the analog signal processing circuit 113.

Before conducting normal operation, the transmitter circuit 100 may apply various known I/Q mismatch calibration procedure to mitigate the I/Q mismatch phenomenon in the transmitter circuit 100, and may generate an estimated image rejection ratio of the transmitter circuit 100, so that relevant inspection personnel or inspection apparatus can measure the I/Q mismatch phenomenon or I/Q mismatch calibration result in the transmitter circuit 100 accordingly.

In operations, the transmitter control circuit 114 may control the in-phase signal processing circuit 111 and the quadrature signal processing circuit 112 to cooperate with the analog signal processing circuit 113 to generate a first predetermined signal Tx1 at a first time point T1, and further control the in-phase signal processing circuit 111 and the quadrature signal processing circuit 112 to cooperate with the analog signal processing circuit 113 to generate a second predetermined signal Tx2 at a second time point T2. The image rejection ratio measurement circuit 117 may generate the estimated image rejection ratio of the transmitter circuit 100 according to the aforementioned first predetermined signal Tx1 and second predetermined signal Tx2.

Figure 2:
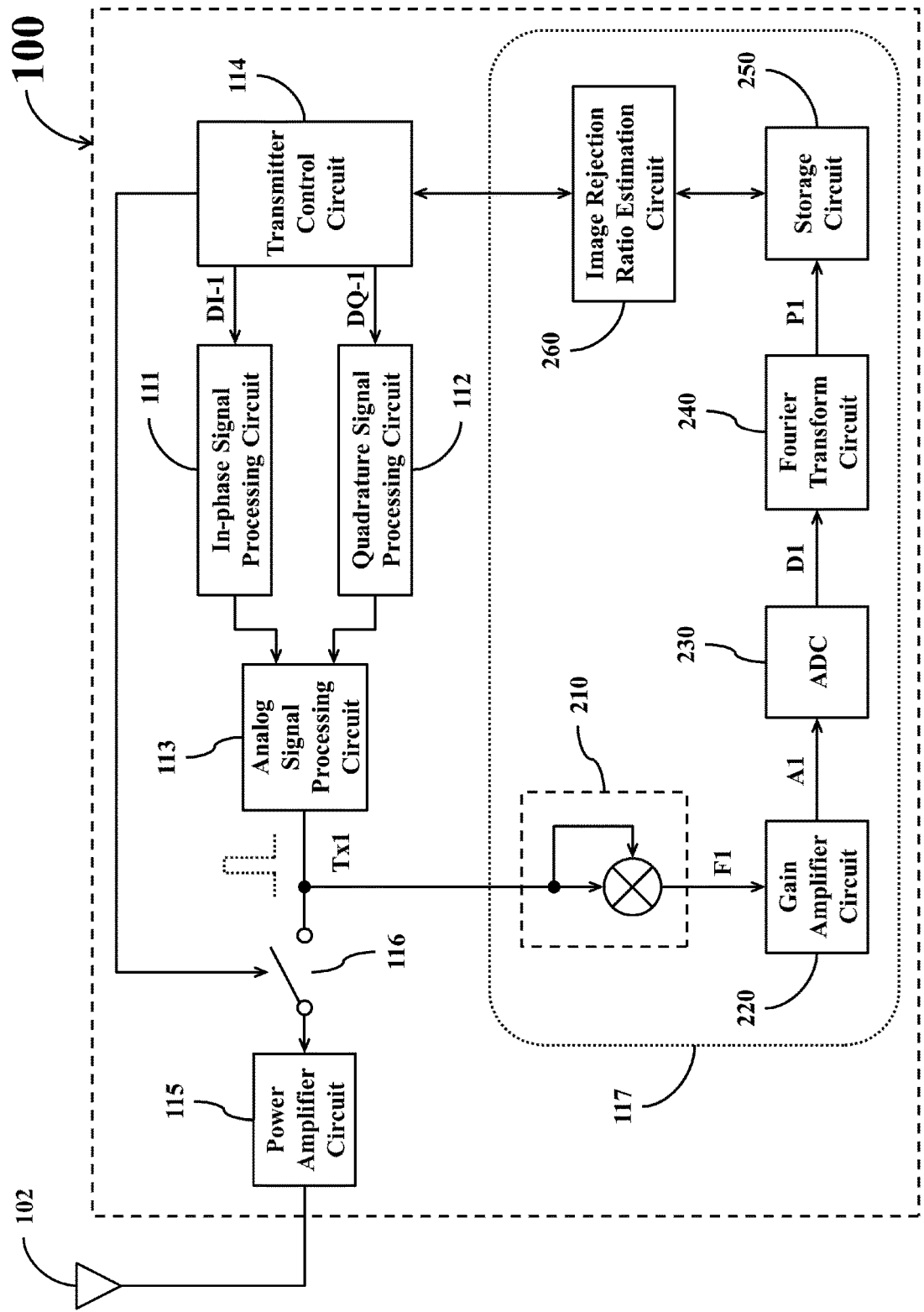
FIG. 2 shows a simplified functional block diagram of an image rejection ratio measurement circuit in FIG. 1 according to one embodiment of the present disclosure.
Figure 3:
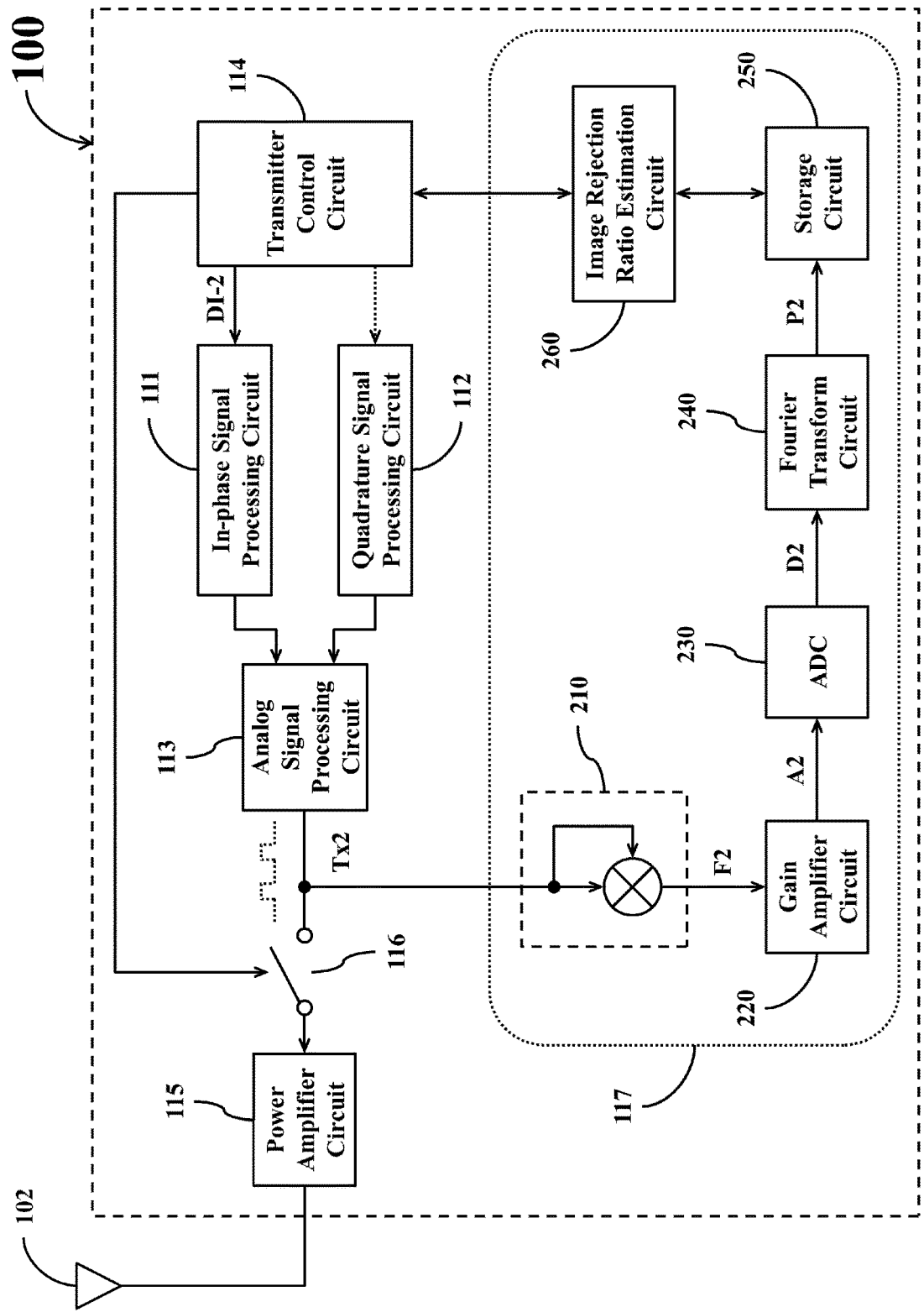
FIG. 3 shows a simplified schematic diagram of the operation of the image rejection ratio measurement circuit in FIG. 1 according to one embodiment of the present disclosure.

The implementation and operation of the image rejection ratio measurement circuit 117 will be further described in the following by reference to FIG. 2 and FIG. 3. FIG. 2 shows a simplified functional block diagram of the image rejection ratio measurement circuit 117 in FIG. 1 according to one embodiment of the present disclosure. FIG. 3 shows a simplified schematic diagram of the operation of the image rejection ratio measurement circuit 117 according to one embodiment of the present disclosure.

In the embodiment of FIG. 2, the image rejection ratio measurement circuit 117 comprises an analog down-converter circuit 210, a gain amplifier circuit 220, an analog-to-digital converter 230, a Fourier transform circuit 240, a storage circuit 250, and an image rejection ratio estimation circuit 260.

The analog down-converter circuit 210 is coupled with an output terminal of the analog signal processing circuit 113, and arranged to operably generate a corresponding down-converted signal according to the signal outputted from the analog signal processing circuit 113.

The gain amplifier circuit 220 is coupled with the analog down-converter circuit 210, and arranged to operably generate a corresponding amplified signal according to the down-converted signal outputted from the analog down-converter circuit 210.

The analog-to-digital converter 230 is coupled with the gain amplifier circuit 220, and arranged to operably generate a corresponding digital signal according to the amplified signal outputted from the gain amplifier circuit 220.

The Fourier transform circuit 240 is coupled with the analog-to-digital converter 230, and arranged to operably generate a corresponding signal power value according to the digital signal outputted from the analog-to-digital converter 230.

The storage circuit 250 is coupled with the Fourier transform circuit 240, and arranged to operably store multiple signal power values generated at different time points by the Fourier transform circuit 240.

The image rejection ratio estimation circuit 260 is coupled with the storage circuit 250 and the transmitter control circuit 114, and arranged to operably generate the estimated image rejection ratio of the transmitter circuit 100 according to multiple signal power values stored in the storage circuit 250. The image rejection ratio estimation circuit 260 may be realized with various suitable circuits having digital computing capability.

In practice, the analog down-converter circuit 210 may be realized with various suitable down-converter circuits. For example, the analog down-converter circuit 210 may be realized with a self-mixer circuit. The gain amplifier circuit 220 may be realized with various suitable amplifier circuits with a fixed gain or variable gain. The Fourier transform circuit 240 may be realized with various suitable circuits having digital computing capability. The storage circuit 250 may be realized with various suitable volatile memories or non-volatile storage circuits. The image rejection ratio estimation circuit 260 may be realized with various suitable circuits having digital computing capability.

In some embodiments, the image rejection ratio estimation circuit 260 may be integrated into the transmitter control circuit 114.

As shown in FIG. 2, when it is needed to generate the estimated image rejection ratio of the transmitter circuit 100, at the aforementioned first time point T1 the transmitter control circuit 114 may transmit a first in-phase signal DI-1 to the in-phase signal processing circuit 111 and also transmit a first quadrature signal DQ-1 to the quadrature signal processing circuit 112 so as to render the in-phase signal processing circuit 111 and the quadrature signal processing circuit 112 to cooperate with the analog signal processing circuit 113 to generate the aforementioned first predetermined signal Tx1.

In this situation, the analog down-converter circuit 210 generates a corresponding first down-converted signal F1 according to the first predetermined signal Tx1. The gain amplifier circuit 220 generates a corresponding first amplified signal A1 according to the first down-converted signal F1. The analog-to-digital converter 230 generates a corresponding first digital signal D1 according to the first amplified signal A1. The Fourier transform circuit 240 generates a corresponding first signal power value P1 according to the first digital signal D1 and stores the first signal power value P1 in the storage circuit 250.

Then, at the aforementioned second time point T2, the transmitter control circuit 114 may transmit a second in-phase signal DI-2 to the in-phase signal processing circuit 111 but not transmit any quadrature signal to the quadrature signal processing circuit 112, so as to render the in-phase signal processing circuit 111 to cooperate with the analog signal processing circuit 113 to generate the aforementioned second predetermined signal Tx2.

In this situation, the analog down-converter circuit 210 generates a corresponding second down-converted signal F2 according to the second predetermined signal Tx2. The gain amplifier circuit 220 generates a corresponding second amplified signal A2 according to the second down-converted signal F2. The analog-to-digital converter 230 generates a corresponding second digital signal D2 according to the second amplified signal A2. The Fourier transform circuit 240 generates a corresponding second signal power value P2 according to the second digital signal D2 and stores the second signal power value P2 in the storage circuit 250.

In this embodiment, the transmitter control circuit 114 may appropriately configure the signals to be transmitted to the in-phase signal processing circuit 111 and the quadrature signal processing circuit 112 at the aforementioned first time point T1 and second time point T2, so as to render the aforementioned first predetermined signal Tx1 to be a single-tone signal, and the second predetermined signal Tx2 to be a two-tone signal, and to further render the energy of each pulse energy of the second predetermined signal Tx2 to be a quarter of the energy of the pulse of the first predetermined signal Tx1.

The image rejection ratio estimation circuit 260 may generate the estimated image rejection ratio of the transmitter circuit 100 according to the first signal power value P1 and the second signal power value P2 stored in the storage circuit 250 under the instruction of the transmitter control circuit 114. For example, the image rejection ratio estimation circuit 260 may generate the estimated image rejection ratio according to the following formula (1):

$$IMR=10*\log 10[16*VP2/VP1] \quad (1)$$

wherein, IMR denotes the value of the estimated image rejection ratio, VP1 denotes the magnitude of the first signal power value P1, and VP2 denotes the magnitude of the second signal power value P2.

In practice, the transmitter control circuit 114 may turn off the switch 116 at the aforementioned first time point T1 and second time point T2, or may keep the switch 116 turning off during a period between the aforementioned first time point T1 and second time point T2, so that the transmitter circuit 100 would not transmit signals through the transmitting antenna 102 during the process of generating the estimated image rejection ratio.

Figure 4:
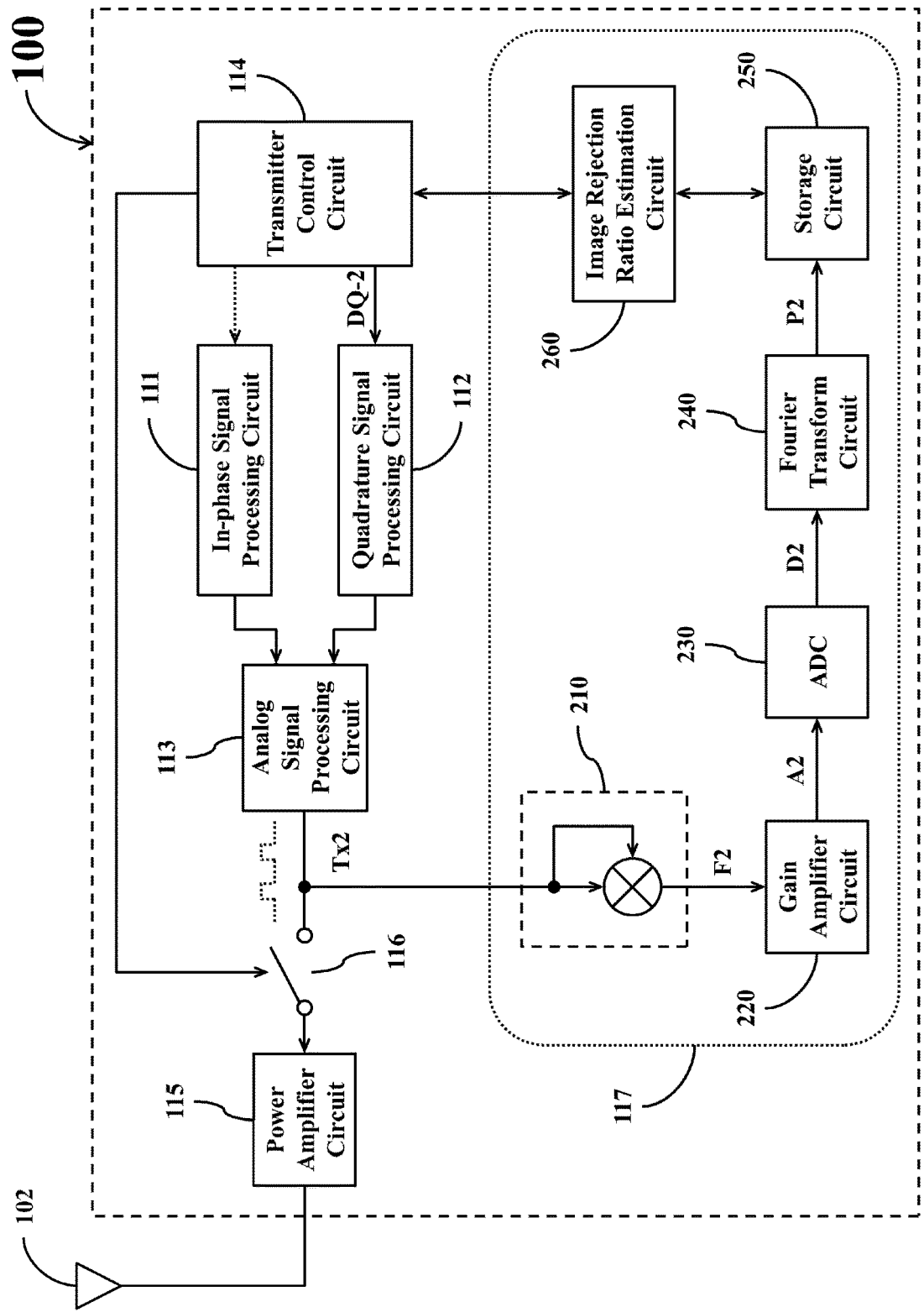
FIG. 4 shows a simplified schematic diagram of the operation of the image rejection ratio measurement circuit in FIG. 1 according to another embodiment of the present disclosure.

FIG. 4 shows a simplified schematic diagram of the operation of the image rejection ratio measurement circuit 117 according to another embodiment of the present disclosure. In the embodiment of FIG. 4, at the aforementioned second time point T2, the transmitter control circuit 114 transmits a second quadrature signal DQ-2 to the quadrature signal processing circuit 112, but does not transmit any in-phase signal to the in-phase signal processing circuit 111. Transmitter control circuit 114 may appropriately configure the second quadrature signal DQ-2 to be transmitted to the quadrature signal processing circuit 112 at the second time point T2, so as to render the quadrature signal processing circuit 112 to cooperate with the analog signal processing circuit 113 to generate the aforementioned second predetermined signal Tx2.

As can be appreciated from the foregoing descriptions, when it needs to measure the I/Q mismatch phenomenon in the transmitter circuit 100, the aforementioned image rejection ratio measurement circuit 117 can be utilized to generate the estimated image rejection ratio for measuring the I/Q mismatch phenomenon of the transmitter circuit 100, and thus there is no need to utilize external apparatus such as a spectrum analyzer to measure the transmitter circuit 100.

During the process of generating the estimated image rejection ratio of the transmitter circuit 100, since there is no need to couple the transmitter circuit 100 with external apparatuses such as the spectrum analyzer, therefore the labors and time required to obtain the image rejection ratio of the transmitter circuit 100 can be effectively reduced.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:
1. A transmitter circuit (100), comprising:
an in-phase signal processing circuit (111);
a quadrature signal processing circuit (112);
an analog signal processing circuit (113), coupled with an output terminal of the in-phase signal processing circuit (111) and an output terminal of the quadrature signal processing circuit (112), arranged to operably generate a corresponding analog signal according to signals outputted from the in-phase signal processing circuit (111) and the quadrature signal processing circuit (112);
a transmitter control circuit (114), coupled with an input terminal of the in-phase signal processing circuit (111) and an input terminal of the quadrature signal processing circuit (112), arranged to operably control the in-phase signal processing circuit (111) and the quadrature signal processing circuit (112) to cooperate with the analog signal processing circuit (113) to generate a first predetermined signal (Tx1) at a first time point (T1), and to operably control the in-phase signal processing circuit (111) and the quadrature signal processing circuit (112) to cooperate with the analog signal processing circuit (113) to generate a second predetermined signal (Tx2) at a second time point (T2); and
an image rejection ratio measurement circuit (117), coupled with an output terminal of the analog signal processing circuit (113) and the transmitter control circuit (114), arranged to operably generate an esti- mated image rejection ratio of the transmitter circuit (100) according to the first predetermined signal (Tx1) and the second predetermined signal (Tx2) under the control of the transmitter control circuit (114).

2. The transmitter circuit (100) of claim 1, wherein the first predetermined signal (Tx1) is a single-tone signal, and the second predetermined signal (Tx2) is a two-tone signal.

3. The transmitter circuit (100) of claim 2, wherein a pulse energy of the second predetermined signal (Tx2) is a quarter of a pulse energy of the first predetermined signal (Tx1).

4. The transmitter circuit (100) of claim 2, wherein at the first time point (T1), the transmitter control circuit (114) transmits a first in-phase signal (DI-1) to the in-phase signal processing circuit (111) and transmits a first quadrature signal (DQ-1) to the quadrature signal processing circuit (112); and at the second time point (T2), the transmitter control circuit (114) only transmits a second in-phase signal (DI-2) to the in-phase signal processing circuit (111) and does not transmit any quadrature signal to the quadrature signal processing circuit (112), or only transmits a second quadrature signal (DQ-2) to the quadrature signal processing circuit (112) and does not transmit any in-phase signal to the in-phase signal processing circuit (111).

5. The transmitter circuit (100) of claim 2, further comprising:
- a switch (116), arranged on an output path of the analog signal processing circuit (113), and controlled by the transmitter control circuit (114);
- wherein the transmitter control circuit (114) turns off the switch (116) at the first time point (T1) and the second time point (T2).

6. The transmitter circuit (100) of claim 2, wherein the image rejection ratio measurement circuit (117) comprises:
- an analog down-converter circuit (210), arranged to operably generate a first down-converted signal (F1) according to the first predetermined signal (Tx1), and to operably generate a second down-converted signal (F2) according to the second predetermined signal (Tx2);
- a gain amplifier circuit (220), coupled with the analog down-converter circuit (210), arranged to operably generate a first amplified signal (A1) according to the first down-converted signal (F1), and to operably generate a second amplified signal (A2) according to the second down-converted signal (F2);
- an analog-to-digital converter (230), coupled with the gain amplifier circuit (220), arranged to operably generate a first digital signal (D1) according to the first amplified signal (A1), and to operably generate a second digital signal (D2) according to the second amplified signal (A2);
- a Fourier transform circuit (240), coupled with the analog-to-digital converter (230), arranged to operably generate a first signal power value (P1) according to the first digital signal (D1), and to operably generate a second signal power value (P2) according to the second digital signal (D2);
- a storage circuit (250), coupled with the Fourier transform circuit (240), arranged to operably store the first signal power value (P1) and the second signal power value (P2); and
- an image rejection ratio estimation circuit (260), coupled with the storage circuit (250) and the transmitter control circuit (114), arranged to operably generate the estimated image rejection ratio according to the first signal power value (P1) and the second signal power value (P2).

7. The transmitter circuit (100) of claim 6, wherein the analog down-converter circuit (210) is a self-mixer circuit.

* * * * *